July 22, 1958  A. G. FOX  2,844,799
GUIDED WAVE TRANSMISSION SYSTEM
Filed Sept. 15, 1955  2 Sheets-Sheet 1
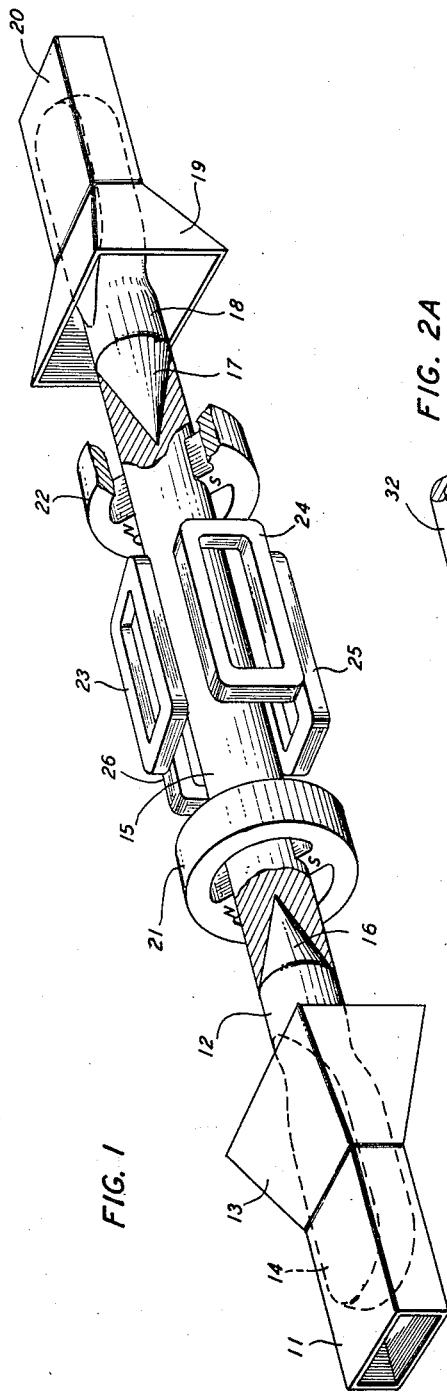
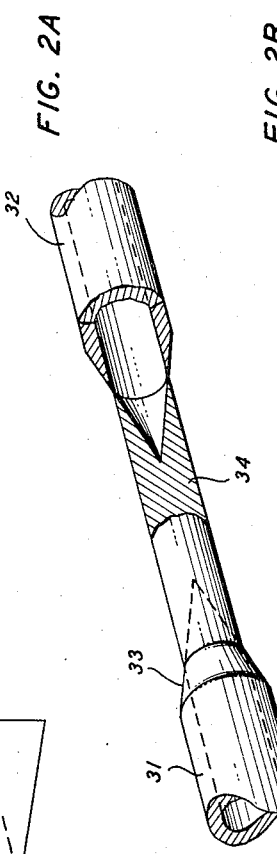
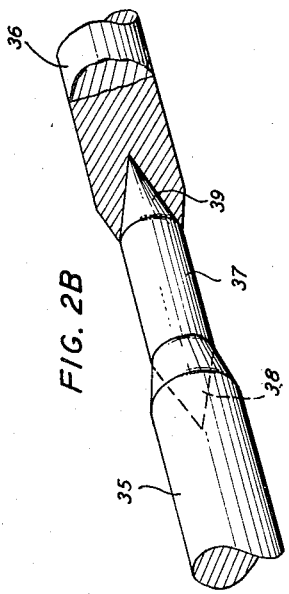
INVENTOR
A. G. FOX
BY *Roy M. Porter Jr.*
ATTORNEY July 22, 1958

A. G. FOX 2,844,799

GUIDED WAVE TRANSMISSION SYSTEM

Filed Sept. 15, 1955

INVENTOR
A. G. FOX
BY Roy M. Porter Jr.
ATTORNEY

United States Patent Office 2,844,799
Patented July 22, 1958

2,844,799
GUIDED WAVE TRANSMISSION SYSTEM

Arthur G. Fox, Rumson, N. J., assignor to Bell Telephone Laboratories, Incorporated, New York, N. Y., a corporation of New York Application September 15, 1955, Serial No. 534,423

16 Claims. (Cl. 333—31)

This invention relates to electromagnetic microwave transmission systems, and more particularly to those systems involving elements of gyromagnetic material subject to rapidly varying magnetic fields for the purpose of achieving continuously variable effects in applications such as amplitude modulation, phase shift, and Faraday-effect rotation.

This application is a continuation in part of my application Serial No. 304,609, filed August 15, 1952, which issued as U. S. Patent No. 2,787,765, on April 2, 1957.

Elements of gyromagnetic material have been utilized inside hollow metallic wave guides to produce various useful and important effects upon wave energy transmitted therethrough. For example, in my copending application Serial No. 301,726, filed July 30, 1952, it is disclosed that differential phase shift may be obtained by applying to such an element a magnetic field transverse to the direction of propagation of wave energy. With the differential phase shifter interposed between two 90-degree phase shifters the amount of phase shift produced by the system may be continuously varied by rotating the transverse field about the direction of wave propagation. In a copending application by C. L. Hogan, Serial No. 252,432, filed October 22, 1951, which issued as United States Patent No. 2,748,353, on May 29, 1956, a gyromagnetic Faraday-effect polarization rotator is used to obtain amplitude modulation, wherein the polarization of the wave energy is continually varied by varying the strength of the longitudinal magnetic field applied to the Faraday element. In these applications, and others, it is thus desirable to vary the strength or orientation of the magnetic field applied to the gyromagnetic element, and it is often advantageous to vary the field rapidly and/or continuously. However, when the magnetic field is so varied, eddy currents are set up in the metallic wave guide sheath which tend to prevent the magnetic field from penetrating the gyromagnetic element. Inefficient operation results as a consequence. It has been found that even where a relatively low frequency of magnetic field variation is desired, as in some modulation applications, the eddy current effect is sufficient to impair operation considerably.

It is an object of the invention, therefore, to rapidly and/or continuously vary the magnetic field applied to a gyromagnetic element in a microwave transmission system without the deleterious interference of eddy currents.

It has been recognized in a dielectric rod wave guide that although a substantial portion of the wave energy is propagated in a rather unusual field configuration about the dielectric, the field inside the dielectric rod conforms closely to those modes of propagation expected in a metal tube wave guide. In addition it has been discovered that if a section of the unsheathed dielectric guide is composed of gyromagnetic material, the amount of wave energy propagated inside the gyromagnetic material is sufficient to be substantially affected by the permeability of the material and variations in permeability caused by an applied magnetic field. As a consequence all the usual effects of gyromagnetic material, under the influence of a magnetic field may be observed though the gyromagnetic material is not within a metallic wave guide but rather serves as the wave guide itself. In this situation the eddy current problem vanishes.

These and other objects and features of the present invention, the nature of the invention and its advantages, will appear more fully upon consideration of the various specific illustrative embodiments shown in the accompanying drawings and of the following detailed description.

In the drawings:

Fig. 1 is a perspective view of an unsheathed gyromagnetic microwave component operative with an applied transverse magnetic field;

Figs. 2a and 2b represent alternative modifications of Fig. 1 in accordance with the invention.

Figure 3:
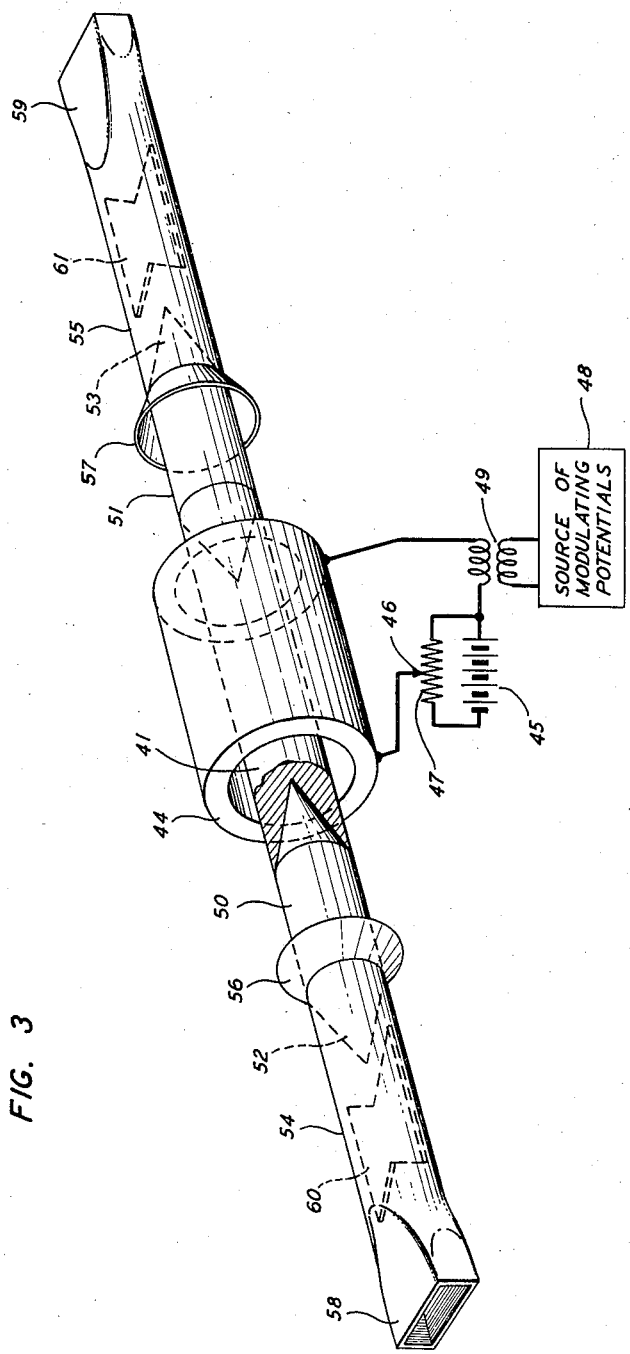
Fig. 3 is a perspective view of an unsheathed gyromagnetic microwave component operative with an applied longitudinal magnetic field.

In more detail, Fig. 1 is a phase changer, given by way of example for purposes of illustration, with the conductive sheath removed in accordance with the invention and employs the all-dielectric wave guide techniques disclosed in my copending applications Serial No. 274,313, filed March 1, 1952, and Serial No. 450,626, filed August 18, 1954. As therein disclosed, electromagnetic wave energy, when properly launched upon a strip or rod of all-dielectric material, i. e., a rod without a conductive sheath, will be guided by the rod with a portion of the energy conducted in a field surrounding the rod. It has been determined that the gyromagnetic materials herein considered may also serve as guiding structures. Because these materials have a much higher index of refraction than the more commonly employed dielectric materials, a sufficient amount of the wave energy will travel within the gyromagnetic material to be substantially affected by its permeability. Although the entire pattern of the wave energy field configuration is of a rather unusual form, that portion of the field pattern inside the gyromagnetic material will substantially conform to the dominant mode pattern if excited by the dominant mode. Therefore, a differential phase shift will be introduced to the energy by planes of different permeability.

In Fig. 1 dominant mode energy in rectangular metallic guide 11 is coupled to dielectric guide 12 of round cross section by means of horn 13 comprising a flared out end of guide 11. Dielectric rod 12 is pushed through horn 13 to extend several wavelengths into guide 11. The match between guide 11 and guide 12 is improved by providing a taper 14, extending along several wavelengths of the portion of guide 12 within guide 11. Guide 12 may consist of any dielectric material having a dielectric constant substantially different from that of air, such as polyflex, polyethylene, to mention only two specific materials. Guide 12 is joined, as a continuation thereof, to rod 15 of gyromagnetic material having a round cross sectional dimension similar to that of guide 12.

Since, as noted above, gyromagnetic guide 15 has a much higher index of refraction than the adjoining dielectric guide 12, a tapered joint 16 extending along several wavelengths is desirably employed at the point of junction of two materials to prevent excessive radiation losses. A similar taper 17 connects the other end of ferromagnetic rod 15 to dielectric guide 18 which is connected by horn 19 to rectangular metallic guide 20.

Permanent magnet structures 21 and 22 are located at spaced points on rod 15 with their pole pieces inclined at 45 degrees to the polarization of wave energy in guides 11 and 20. Interposed between magnets 21 and 22 are four solenoids 23, 24, 25 and 26 which may be symmetrically arranged upon a suitable supporting structure about the center portion of rod 15. Opposite solenoids may be connected together in pairs to sources of exciting current to produce a rotating magnetic field transverse to the center portion of rod 15. When the strength of the magnetic field supplied by magnets 21 and 22 is adjusted to produce a 90-degree differential phase shift in the portion of rod 15 excited by these magnets, and when the field strength supplied by solenoids 23, 24, 25 and 26 is adjusted to produce a 180-degree differential phase shift in the center portion of rod 15, the single gyromagnetic element 15 serves the three functions of converting the linearly polarized wave into a circularly polarized wave, rotating the instantaneous polarization of the circularly polarized wave, and reconverting the rotated circularly polarized wave into a linearly polarized wave. If the direction of the magnetic field applied by the solenoids is rotated by an angle $\theta$, the phase shift of electromagnetic wave energy through the device will change by $2\theta$. Therefore, if $\theta$ is continually varied by rotation of the magnetic field, a continuous change in phase will be produced.

Element 15 may be a block of gyromagnetic material of the type exhibiting a Faraday-effect rotation when in the presence of a longitudinal magnetizing field. These materials comprise an iron oxide with a quantity of the oxide of nickel, magnesium, zinc, manganese, or other similar material in which the other oxides combine with the iron oxide in a spinel structure. This material is known as a ferromagnetic spinel or a ferrite. On the basis of their electrical properties, a particularly suitable designation of this class of materials is "gyromagnetic" to designate materials having magnetic moments capable of being aligned by an external magnetic field and capable of exhibiting the precessional motion of a gyroscopic pendulum.

As a specific example, element 15 may be a cylindrical block of nickel-zinc ferrite prepared in the manner disclosed in the above-mentioned copending application of C. L. Hogan. It has been determined that when these materials are magnetized by a strong transverse magnetic field, they exhibit a permeability constant of one value for electromagnetic waves having their magnetic vectors polarized parallel to the magnetizing field and a different value for electromagnetic waves having their magnetic vectors polarized perpendicular to the magnetizing field. This effect may theoretically be explained by the assumption that the ferromagnetic material contains unpaired electron spins which tend to line up with the applied magnetizing field. An electromagnetic wave having its magnetic vector in the direction of the magnetizing field (the electric vector perpendicular to the magnetizing field) will be unable to reorient the electron spins to any appreciable extent and, hence, will see a permeability close to unity. A wave having its magnetic vector at right angles to the magnetizing field will cause the electron spins to precess about the axis of the magnetizing field in synchronism with the applied electromagnetic wave. Such a wave will see a permeability substantially different from unity because the precessing spins now yield a component of radio frequency flux density along the wave's magnetic vector. The amount of difference from unity will be determined by the strength of the magnetizing field.

Since the phase velocity of a wave passing through a material depends upon the permeability of the material, a wave traversing the gyromagnetic material of element 15, in the region subject to the transverse magnetic field of permanent magnet 21, with its electric vector polarized parallel to the magnetic field will exhibit a higher phase velocity than the wave polarized perpendicular to the magnetic field. An element having this property, namely, the ability to transmit two sets of waves polarized at right angles to one another with different speeds, will produce two different phase delays for the two polarizations and, accordingly, may be termed a "differential phase shift element." The value of this phase shift difference for a ferromagnetic element is approximately proportional to the volume of the material traversed by the waves and to the intensity of the magnetization to which the material is subjected. It may be shown by mathematical analysis for an infinite ferrite medium where the frequency of the wave energy is much greater than the gyromagnetic resonance frequency that this phase difference expressed in radians is substantially given by the expression $$\left[\frac{\gamma^2 M^2}{\omega} + \frac{\gamma^2 MH}{\omega}\right]\frac{l}{2}\sqrt{\epsilon\mu}$$

in which $l$ is the thickness of the material in meters, $\epsilon$ is the dielectric contant of the material, $\mu$ is its permeability without exciting magnetic field, M is the saturation magnetization of the material, H is the exciting magnetic field, $\omega$ represents the frequency of the wave energy and $\gamma$ is the spectroscopic splitting factor of the material. In the case of the ferrite wave guide, the phase difference will have much the same dependence upon these parameters as given in the above expression. In accordance with the invention, the differential phase shifts of element 15 in the region of permanent magnets 21 and 22 are made equal to 90 degrees and the differential phase shift in the region of the solenoid is made equal to 180 degrees, by properly choosing the thickness and length of element 15 and the strength of the magnetic field applied to each region, either by calculations in accordance with the above expression, or by adjustments on an empirical basis.

By way of illustrating the applications of the all-dielectric wave guide techniques in accordance with the invention, all of the three differential phase shift functions described above were performed in a single gyromagnetic element. However, it should be noted that separate gyromagnetic elements may be used each separated from the other by a section of dielectric guide. On the other hand only the 180-degree differential section may comprise an unsheathed ferromagnetic element while the 90-degree sections preceding and following it may be situated beyond dielectric guides 12 and 18 for example, within metallic guides 11 and 20. Horns 13 and 19 and tapers 14 would still be employed to launch the now circularly polarized waves upon the dielectric wave guides 12 and 18.

As noted above, tapered joints 16 and 17 are employed to prevent mismatches between the dielectric guides 12 and 18 and the gyromagnetic rod 15. As illustrated in Fig. 1 these tapers comprise conical points on the ends of guides 12 and 18 which fit into corresponding conical depressions in the ends of rod 15. Other methods of matching the materials may be employed. For example, the index of refraction of the dielectric material of guides 12 and 18 could be made the same as the index of refraction of the gyromagnetic material. This would tend to maintain the external field of the energy conveyed along the combination at a constant diameter. Alternatively, if the index of refraction of the magnetic material is higher than that of the dielectric material, the field of the energy may be maintained constant by providing the dielectric rod with a proportionately larger diameter than the diameter of the magnetic rod as shown in Figs. 2a and 2b. The transition between the two diameters may be made, for example as shown in Fig. 2a, by providing the dielectric rods 31 and 32 with conical points, such as 33, to fit within a corresponding depression in magnetic rod 34. The center core of rods 31 and 32 may then be drilled out or otherwise removed. In Fig. 2b the transition is made by providing conical regions of equal taper upon the three rods 35, 36 and 37, those of rods 35 and 36 being truncated, and then providing corresponding conical depressions in the apex surfaces of the truncated conical regions of dielectric rods 35 and 36 to receive the points 38 and 39, respectively, of magnetic rod 37.

In Fig. 3 an amplitude modulator similar to that disclosed in the above-mentioned copending application by C. L. Hogan is represented for purposes of example and illustration. The modulator depends upon the use of an unsheathed Faraday-effect polarization rotator in accordance with the invention in conjunction with horizontally oriented dissipative vanes of resistive material. The vanes will pass vertically polarized components of wave energy but will dissipate horizontal components. By varying the wave polarization with the Faraday rotator the magnitude of the vertical components will vary, and thus the amplitude of the wave propagated past the vanes will be modulated. The Faraday rotator hereinafter to be described is unsheathed in order to achieve efficient modulation at any frequency of applied magnetic field desired.

Considering the Faraday-effect rotator section of the modulator, element 41 is an unsheathed cylindrical rod of gyromagnetic material similar to element 15 of Fig. 1. This structure is a means of the type which produces rotation of the plane of polarization of transmitted electromagnetic waves, i. e., a Faraday-effect element having such properties that an incident wave impressed upon a first side of the element emerges on the second side polarized at a different angle from the original wave. As a specific embodiment, element 41 may be a block of gyromagnetic material, for example nickle-zinc ferrite prepared in the manner disclosed in the above-mentioned copending application of C. L. Hogan. This material has been found to operate satisfactorily as a directionally selective Faraday-effect rotator for polarized electromagnetic waves when placed in the presence of a longitudinal magnetizing field of strength which is readily produced in practice and in such thickness is capable of transmitting electromagnetic waves, for example in the centimeter range, with substantially negligible attenuations. Suitable means for producing the necessary longitudinal magnetic field surrounds element 41 which means may be a solenoid 44 supplied by a variable energizing current from source 45 taken by way of contact arm 46 off potentiometer 47. The angle of rotation of polarized electromagnetic waves in such magnetic material is approximately directly proportional to the thickness and length of the material traversed by the waves and to the intensity of the magnetization to which the material is subjected, whereby it is possible to adjust the amount of rotation by varying or properly choosing the thickness and length of element 41 and the intensity of magnetization supplied by solenoid 44 by adjustment of potentiometer 47.

A source of modulating potentials 48 is arranged in series with solenoid 44 being connected thereto through a suitable transformer 49.

With the potentiometer arm 46 set permanently at an intermediate position on the potentiometer 47, and in the absence of modulating potentials an intermediate amount of polarization rotation is introduced, for example 45 degrees. Application of modulating potentials from the source 48 serves to vary the magnetizing current in solenoid 44, thereby alternately increasing and decreasing the amount of polarization rotation produced about the reference 45-degree value.

On each side of the Faraday-effect rotator is an unsheathed all-dielectric cylindrical rod 50 and 51, which is formed as a continuation of unshielded gyromagnetic element 41 and is contiguous thereto in the manner of any of the suggested illustrative arrangements of Figs. 1, 2a or 2b. By way of specific example, elements 41, 50 and 51 are joined as illustrated in Fig. 1. The opposite ends of dielectric guides 50 and 51 form conical tapers 52 and 53 extending several wavelengths. The tapered regions are inserted in round metallic sheath wave guides 54 and 55 which end in outwardly flaring horns 56 and 57 in a similar manner and for the same matching purpose as discussed above in Fig. 1. Guides 54 and 55 taper to form a transition to rectangular guides 58 and 59 whose short sides are vertical so as to sustain vertically polarized waves. Horizontally disposed across the diameters of each of round guides 54 and 55 is a dissipative vane of resistive material, respectively 60 and 61.

In the operation of the modulator, vertically polarized waves in the TE$_{10}$ mode entering guide 58 will be launched in round guide 54 vertically polarized in the TE$_{11}$ mode. All components of the waves being perpendicular to the horizontal resistive vane 60, they will pass thereby uneffected and will be launched in and about dielectric guide 60; the portion of the field pattern inside the dielectric rod remaining linear and transverse and otherwise similar to the TE$_{11}$ mode. On passing through gyromagnetic element 41, and thus the Faraday-effect rotator, the polarization of the waves will vary about a 45-degree value due to the variation in permeability in gyromagnetic element 41 caused by the variation in the applied magnetic field responsive to the modulating potentials. The polarization modulated waves are then guided by dielectric rod 51 exciting round metallic guide 55 in the TE$_{11}$ mode. The polarization modulated waves, on passing resistive vane 61 become amplitude modulated since only the vertical components will pass; the energy associated with the horizontal components being dissipated in vane 61. The vertically polarized amplitude modulated waves then are supported in rectangular guide 59 in the TE$_{10}$ mode. Waves transmitted in the opposite direction would be operated upon in precisely the same manner.

It may be noted in both Fig. 1 and Fig. 3 that the unsheathed rod of gyromagnetic material is coupled at each end to metallic wave guide sections through the medium of the unsheathed all-dielectric rods. Utilizing the interposed dielectric rods permits the transmission of waves from the metallic guide to the phase shifter or Faraday rotator, as the case may be, with a minimum amount of attenuation. However, it may be convenient structurally to dispense with the dielectric rods and taper the ends of the gyromagnetic element itself so that it may be directly inserted and coupled to the metallic guides. The additional attenuation resulting from wave energy traversing an extra length of gyromagnetic material rather than the all-dielectric rod may be tolerated in some uses of the embodiments of Figs. 1 and 3 and other applications of the invention. When this is the case, the direct coupling may be advantageously utilized.

An advantage over the prior art is afforded by the invention other than the elimination of interfering eddy currents. It is the case that any given polarized gyromagnetic material used in a metallic wave guide as a Faraday-effect rotator produces an angle of rotation that increases non-linearly with frequency. This phenomenon decreases the efficiency of systems utilizing the Faraday rotator, such as isolators and modulators, when operated over a wide band of frequencies. However, it has been ascertained that when the gyromagnetic material is unsheathed, the amount of rotation produced is independent of frequency if the operating frequency is much higher than the resonance frequency of the gyromagnetic material. Therefore, if it is otherwise desirable to operate at those high frequencies, an unshielded Faraday rotator in accordance with the invention, used at those frequencies, would be a "broad-band" device.

In all cases, it is understood that the above-described arrangements are simply illustrative of a small number of many possible specific embodiments which can represent applications of the principles of the invention. Numerous and varied other arrangements can readily be devised in accordance with said principles by those skilled in the art without departing from the spirit and scope of the invention.

What is claimed is:

1. An electromagnetic wave transmission system comprising first and second wave guiding sections of all-dielectric material, a wave guiding section comprising dielectric material having gyromagnetic properties interposed longitudinally between said first and second sections, said gyromagnetic section having one end contiguous to said first section and the other contiguous to said second section, means for applying a magnetic field to said gyromagnetic section, and a medium consisting solely of dielectric material separating said gyromagnetic wave guiding section from said means and surrounding said first and second sections, said dielectric medium having a dielectric constant substantially different from that of said gyromagnetic and first and second sections, whereby a substantial portion of the wave power is conveyed in an electromagnetic field surrounding said sections.

2. A combination as recited in claim 1 wherein said magnetic field is applied transverse to the longitudinal axis of said gyromagnetic section and rotatable there about.

3. A combination as recited in claim 1 wherein said magnetic field is of variable strength and applied longitudinally to said gyromagnetic section.

4. A combination as recited in claim 1 wherein said means for applying said magnetic field is longitudinally coextensive with said gyromagnetic section circumscribing said gyromagnetic section and at least a portion of said electromagnetic field surrounding said gyromagnetic section.

5. An electromagnetic wave transmission system comprising first and second all-dielectric wave guiding rods, a wave guiding rod of gyromagnetic material interposed longitudinally between said first and second all-dielectric rods, said gyromagnetic rod having one end contiguous to said first rod and the other contiguous to said second rod, a medium consisting entirely of dielectric material having a dielectric constant substantially different from that of said first, second and gyromagnetic rods, said medium surrounding and contiguous to all said rods to form a dielectric discontinuity laterally bounding said rods, whereby a substantial portion of the wave power is conveyed in an electromagnetic field surrounding said rods, and means for applying a magnetic field to said gyromagnetic rod, said means being disposed in said medium.

6. A combination as recited in claim 5 wherein the cross sectional dimensions of all of said rods are equal.

7. A combination as recited in claim 5 wherein said gyromagnetic rod has a higher index of refraction than said first and second all-dielectric rods and has a cross sectional diameter less than that of said first and second rods, whereby said electromagnetic field surrounding all of said rods remains constant in diameter.

8. A combination as recited in claim 5 wherein each end of said gyromagnetic rod forms a conical point and said ends of said first and second rods contiguous to the ends of said gyromagnetic rods have conical depressions to receive said conical points.

9. A combination as recited in claim 7 wherein each end of said gyromagnetic rod has a conical depression, said ends of said first and second rods contiguous to the ends of said gyromagnetic rod forming conical points to fit in said conical depressions, said first and second rods also having longitudinally disposed cylindrical cavities radially symmetric about the longitudinal axis of said first and second rods.

10. A combination as recited in claim 7 wherein each end of said gyromagnetic rod forms a conical point, the ends of said first and second rods contiguous to said gyromagnetic rod forming truncated right conical regions, the apex surfaces of said truncated conical regions having conical depressions to receive said pointed ends of said gyromagnetic rod.

11. An electromagnetic wave transmission system comprising in combination a wave guiding section of dielectric material having gyromagnetic properties, a first means at one end of said section for exciting said section with said electromagnetic waves when said waves are transmitted in a given direction and excitable by said section with said waves when said waves are transmitted in a direction opposite to said given direction, a second means at the opposite end of said section for exciting said section with said waves transmitted in a direction opposite to said given direction and excitable by said section with said waves when said waves are transmitted in said given direction, a medium of dielectric material surrounding said gyromagnetic wave guiding section having a dielectric constant substantially less than said section, and means for applying a magnetic field to said section, said means being disposed in said medium, said combination having a substantially uniform resistivity from substantially the longitudinal axis of said wave guiding section radially to said means.

12. A differential phase shifting microwave component comprising first and second means for converting between circular and linear polarizations, a wave guiding rod of dielectric material having gyromagnetic properties interposed between said first and second means, a medium consisting solely of dielectric material surrounding and contiguous to said rod and extending away therefrom a finite distance, and means disposed in said medium for applying a rotatable magnetic field to said gyromagnetic rod transverse to the longitudinal axis of said rod.

13. A polarization rotating microwave component comprising a wave guiding rod of dielectric material having gyromagnetic properties, a medium consisting solely of dielectric material surrounding said rod and having a dielectric constant substantially different from said rod, and means disposed in said medium for applying a magnetizing field of variable strength to said rod in a direction parallel to said rod's longitudinal axis.

14. In an electromagnetic wave transmission system a wave guiding section of dielectric material having gyromagnetic properties, a medium consisting solely of dielectric material having a dielectric constant substantially different from said section, said medium surrounding and contiguous to said section and extending away therefrom a finite distance, means disposed in said medium for applying a magnetic biasing field to a region of said gyromagnetic section, said region being disposed between the two ends of said section, and a plurality of electromagnetic wave components coupled to each end of said gyromagnetic section.

15. An electromagnetic phase shifter comprising a wave guiding member of all-dielectric material, a wave guiding member of dielectric material having gyromagnetic properties interposed in a center portion of said all-dielectric member, a medium consisting solely of dielectric material having a substantially different dielectric constant from said all-dielectric and gyromagnetic members surrounding and contiguous to said members and extending away therefrom a finite distance, means on the input side of said gyromagnetic member for converting said wave energy from linear to circular polarization, means on the output side thereof for reconverting to linear polarization, and means disposed in said medium for applying a magnetic field to said gyromagnetic member, said field being transverse to and rotatable about the axis of the direction of propagation of wave energy through said gyromagnetic member.

16. For use in an electromagnetic wave energy transmission system, a combination comprising a wave guiding section of dielectric material having gyromagnetic properties to propagate said wave energy, a medium consisting entirely of dielectric material having a substantially different dielectric constant from said gyromagnetic section surrounding and contiguous to said section and extending away therefrom a finite distance, and means disposed in said medium for applying a magnetic biasing field to said gyromagnetic section.

References Cited in the file of this patent

UNITED STATES PATENTS

| | | |
|---|---|---|
| 2,129,711 | Southworth | Sept. 13, 1938 |
| 2,719,274 | Luhrs | Sept. 27, 1955 |
| 2,745,069 | Hewitt | May 8, 1956 |
| 2,755,447 | Englemann | July 17, 1956 |
| 2,760,162 | Miller | Aug. 21, 1956 |
| 2,784,382 | Harris | Mar. 5, 1957 |

FOREIGN PATENTS

| | | |
|---|---|---|
| 980,648 | France | Dec. 27, 1950 |

OTHER REFERENCES

"N. B. S. Magnetic Attenuator," Technical News Bulletin of The National Bureau of Standards, August 1951, pp. 110–11.